Patented Dec. 5, 1950

2,533,052

UNITED STATES PATENT OFFICE 2,533,052

PRODUCTION OF HALOGENATED HYDROCARBONS

Louis Schmerling, Riverside, Ill., assignor to Universal Oil Products Company, Chicago, Ill., a corporation of Delaware No Drawing. Application October 31, 1945, Serial No. 625,950

17 Claims. (Cl. 260—648)

This application is a continuation-in-part of my copending application Serial No. 496,567, now abandoned, filed July 29, 1943.

This invention relates to the condensation of a monohalogenated saturated hydrocarbon having at least 3 carbon atoms per molecule with an olefinic compound selected from the group consisting of a mono-olefin and a halomono-olefin to produce a halogenated saturated hydrocarbon of higher boiling point than said olefinic compound. More specifically, the process is concerned with the condensation of a monohaloalkane or a monohalocyclo-alkane and a mono-olefinic hydrocarbon or halomono-olefin in the presence of a boron trifluoride catalyst.

By the term "condensation" used in this specification and in the claims, I mean the chemical combination of a monohalogenated saturated hydrocarbon and an olefinic compound selected from the group consisting of a mono-olefin and a halomono-olefin to produce a higher boiling halogen-containing compound with a molecular weight equal to the sum of the molecular weights of said monohalogenated saturated hydrocarbon and olefin or of said monohalogenated saturated hydrocarbon and halomono-olefin.

An object of this invention is to condense a monohalo-alkane and a mono-olefin to form a higher boiling monohalo-alkane.

Another object of this invention is to condense a monohalo-alkane and a monohalomono-olefin to form a dihalo-alkane.

A further object of this invention is to condense a monohalocyclo-alkane and a mono-olefin in the presence of a boron trifluoride catalyst.

A still further object of this invention is to condense a monohalo-alkane and a cyclo-olefin in the presence of a boron trifluoride catalyst.

In one specific embodiment the present invention comprises a process for condensing a monohalogenated saturated hydrocarbon having at least 3 carbon atoms per molecule and a mono-olefinic compound selected from the group consisting of a mono-olefin and a halomono-olefin in the presence of a boron trifluoride catalyst to produce a higher boiling halogenated saturated hydrocarbon.

A further embodiment of the present invention comprises a process for condensing a monohaloalkane having at least 3 carbon atoms per molecule and a mono-olefinic compound selected from the group consisting of a mono-olefin and a halomono-olefin in the presence of a boron trifluoride catalyst to produce a higher boiling halo-alkane.

Monohalogenated saturated hydrocarbons which react with mono-olefins or halomono-olefins, according to the process of this invention, have at least 3 carbon atoms per molecule and including alkyl halides and halocycloparaffins which are also referred to as monohalo-alkanes and monohalocyclo-alkanes, respectively. In general, tertiary halides are more reactive than primary and secondary halides in these condensation reactions, although primary and secondary halides may also be condensed with mono-olefins and halomono-olefins as herein set forth. While chlorides and bromides are generally preferred for use in condensation reactions with mono-olefins and halomono-olefins, different alkyl fluorides and iodides and monofluoro- and monoiodocyclo-alkanes are also utilizable although not necessarily under the same conditions of operation, particularly when different unsaturated compounds such as olefins and halo-olefins are also involved in the production of various higher molecular weight halogen compounds. Examples of monochloro-alkanes and monochlorocyclo-alkanes which are especially useful in the process of this invention are tertiary butyl chloride, tertiary amyl chloride, 1-chloro-1-methylcyclopentane, 1-chloro-1-methylcyclohexane, and 9-chlorodecahydronaphthalene.

The mono-olefinic hydrocarbons utilizable in the present process include alkenes and cyclo-alkenes. These mono-olefins may be either normally gaseous or normally liquid and comprise ethylene, propylene, butylenes, and higher normally liquid olefins, the latter including various polymers of normally gaseous mono-olefins. These alkenes and cyclo-alkenes which are utilizable in the present process may be obtained from any source and particularly from the products of catalytic and thermal cracking of oils, by dehydrogenation of paraffinic hydrocarbons, or by the dehydration of alcohols.

Cyclo-olefinic hydrocarbons useful in the present process comprise cyclic hydrocarbons of the general formula $C_nH_{2n-2}$ in which $n$ represents an integer which is at least 3 and is preferably 5 or 6. Cyclopentene, alkylcyclopentenes, cyclohexene, and alkylcyclohexenes are the cyclic mono-olefins which I prefer to react with a monohalo-alkane to produce alkylcyclopentyl and alkylcyclohexyl halides including monoalkyl and polyalkylcycloalkyl halides. Thus, a cyclo-olefin and a monohalo-alkane condense to form a monohaloalkyl-cyclo-alkane, while a monoalkylcycloolefin and a monohalo-alkane react to form a monohalodialkylcyclo-alkane. Cyclopropene, cyclobutene, and alkyl cyclobutenes are generally more difficult to obtain than the cyclo-olefins containing rings of 5 or 6 carbon atoms and accordingly these cyclo-olefins of lower molecular weight are used less frequently in the present process.

Monohalo-olefins which are condensed with monohalogenated saturated hydrocarbons as herein set forth contain one hydrogen atom and one double bond per molecule, and comprise haloethenes, -propenes, -butenes, -pentenes, and higher halo-alkenes. Vinyl chloride, allyl chloride, allyl bromide, propenyl chloride, and isopropenyl chloride are representative of suitable haloolefins containing one halogen atom and one double bond per molecule and utilizable in the present process. Halo-olefins suitable for the process also include halocyclo-olefins containing one halogen atom and one double bond per molecule. Monohalomono-olefins may be formed in any suitable manner such as by the action of a halogen upon an olefin at a temperature at which substitution occurs and substantially in excess of that at which the principal reaction is the addition of halogen to the olefinic double bond. They may also be prepared by the addition of a halogen to an olefinic double bond to form a dihaloalkane from which one molecular proportion of hydrogen halide may be removed by any of several well known methods to produce a monohalomono-olefin. Furthermore, monohalomono-olefins may be prepared by addition of a hydrogen halide to an acetylenic hydrocarbon.

Dichloroethylene, dichloropropene, and other polyhalomono-olefins are also utilizable in my process for condensing with a monohalo-alkane or monohalocyclo-alkane.

The boron trifluoride catalyst employed in the process of this invention has the advantage over a metal halide catalyst of the Friedel-Crafts type, which I have also found may be used for assisting condensations of the types herein described, in that boron trifluoride is a gas and is sufficiently soluble in the alkyl halide or halocycloparaffin to permit a practically homogeneous reaction. Furthermore, alkyl halides such as tertiary butyl chloride are quite stable in the presence of boron trifluoride as evidenced by the fact that more than 90% of tertiary butyl chloride was recovered from the product obtained by saturating tertiary butyl chloride with boron trifluoride at 8° C. and permitting the solution to stand at that temperature for 2 hours. Also, alkyl fluorides, e. g., tertiary butyl fluoride may be condensed with olefins and halo-olefins in the presence of catalytic amounts of boron fluoride but not of aluminum chloride.

The process for condensing a monohalogenated saturated hydrocarbon with an olefin or cyclo-olefin apparently involves the addition of the alkyl halide to the double bond of the unsaturated hydrocarbon to produce another alkyl halide of higher molecular weight. For example, the condensation of tertiary butyl chloride with ethylene produces 4-chloro-2,2-dimethylbutane, which is a monochloroneohexane, as illustrated by the following equation:

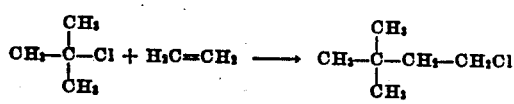

Tertiary butyl chloride undergoes similar condensations with propylene and with n-butylenes producing chloroheptane and chloro-octane, respectively. Similarly, bromoheptane may be obtained by the reaction of tertiary butyl bromide with propylene. Under some conditions the combination of an alkyl halide with an olefin may be so controlled as to give other higher boiling alkyl halides containing all of the components of both the original olefin and lower boiling alkyl halide charged to the process. When isopropyl chloride is reacted with ethylene the product is a chloroheptane formed by the interaction of one mole of isopropyl chloride with two moles of ethylene.

Reactions between monohalogenated saturated hydrocarbons and halo-olefins apparently involve the addition of the former to the double bond of the halo-olefin to produce a halo-alkane with a molecular weight equal to the sum of the molecular weights of the two reactants. For example, the condensation of tertiary butyl chloride and vinyl chloride produces 1,1-dichloro-3,3-dimethylbutane which is a dichloroneohexane. This reaction is illustrated by the following equation:

$$(CH_3)_3CCl + H_2C=CHCl \rightarrow (CH_3)_3CCH_2CHCl_2$$

The dichlorohexane indicated in the preceding equation may be converted into neohexane, tertiary butyl acetaldehyde, chlorohexene, or other desirable compounds. The process of this invention thus teaches a simple method for preparing compounds containing a quaternary carbon atom as well as of homologs of vinyl chloride.

The condensation of a monohalogenated saturated hydrocarbon and a mono-olefinic compound selected from the group consisting of a mono-olefin and a halomono-olefin is carried out by contacting these reactants in the presence of boron trifluoride at a temperature of from about —10° to about 100° C. but preferably at a temperature of from about —10° to about 50° C., when a tertiary butyl halide is present and while maintaining a pressure sufficient to keep in liquid state a substantial proportion of the reaction mixture. The condensation of different monohalo-alkanes and monohalocyclo-alkanes with different mono-olefins and halomono-olefins are not necessarily carried out with equal ease nor at the same conditions of operation.

The reaction of a monohalogenated saturated hydrocarbon with an olefin or halo-olefin may be carried out in the presence of a boron trifluoride catalyst in either batch or continuous types of operation. In match type operation, desired proportions of monohalo-alkane and a mono-olefin or monohalo-alkane and a halo-olefin are introduced to a suitable reactor together with a boron trifluoride catalyst, and the resultant commingled materials are contacted at a reaction temperature until a substantial proportion of the reactants is converted into the desired higher molecular weight halogenated hydrocarbon. The reaction mixture, after separation from the catalyst, is fractionated to separate the unconverted monohalogenated saturated hydrocarbon and olefin or halo-olefin from the higher boiling halogenated hydrocarbon reaction product, and the recovered materials may then be used in another run to produce an additional quantity of the desired halogenated hydrocarbon.

Continuous operations may be carried out by conducting a mixture of a monohalogenated saturated hydrocarbon and a mono-olefin or halomono-olefin through a reactor of suitable design in the presence of boron trifluoride. In this type of treatment, the operating conditions may be adjusted suitably, and may differ somewhat from those employed in batch type operation.

In some cases it may be advisable to commingle the charged monohalo-alkane or monohalocycloalkane and monoolefin or halomono-olefin with a substantially inert solvent such as a paraffinic hydrocarbon, for example, normal pentane, and then to effect condensation in the presence of this added solvent and of the boron trifluoride catalyst. Obviously the solvent chosen should be one which does not undergo undesirable reactions with the other components of the reaction mixture under the operating conditions of the reaction.

Different higher boiling halogenated hydrocarbons produced by the present process may be used for various purposes. Some of them may be converted into hydrocarbons of high antiknock value, others may be used as solvents or employed as intermediate compounds in organic syntheses.

The following examples are given to illustrate the character of results obtained by the use of the present process, although the data presented are not introduced with the intention of unduly restricting the generally broad scope of the invention.

Example I

Condensation of tertiary butyl chloride with propylene took place in excellent yield when 26 grams of this olefin were passed at 10° C. during a period of forty minutes into a solution of 8 grams of boron trifluoride in 100 grams of tertiary butyl chloride. The principal product was 49 grams of a chloroheptane (B. P. 125–135° C.; $n_D^{20}$ 1.4275) consisting mainly of 4-chloro-2,2-dimethylpentane.

Example II

The condensation of tertiary butyl chloride with ethylene took place in the presence of boron trifluoride at room temperature. This reaction was carried out as a batch operation in a rotating autoclave to which 50 grams of tertiary butyl chloride and 4 grams of boron trifluoride were charged, and ethylene was pressed into a pressure of 40 atmospheres after which the autoclave was rotated at room temperature for four hours. It was then allowed to set overnight before being opened. There was obtained 16 grams of chlorohexane (B. P. 115–120° C.) as well as 8 grams of chloro-octane and a substantial amount of other secondary products.

Example III

Isopropyl chloride was reacted with ethylene at 70° C. in a rotatable steel autoclave in a manner similar to that used in Example II. The principal product was a chloroheptane, namely 1-chloro, 3,3-dimethylpentane (B. P., 148–150° C.) and not a chloropentane. The formation of the chloroheptane apparently involved the reaction of one molecular proportion of isopropyl chloride with two molecular proportions of ethylene. In this reaction it is presumed that an amyl chloride was formed first by the condensation of equal molecular proportions of isopropyl chloride and ethylene, and that the amyl chloride then reacted with an additional molecular proportion of ethylene to yield the chloroheptane.

Example IV

Boron trifluoride was passed slowly into a solution of 45 grams of tertiary butyl chloride and 4 grams of cyclohexene maintained at 0° C. until the solution was saturated, when about 3 grams of boron trifluoride was absorbed. The reaction mixture was permitted to stand at 0° C. for 20 hours after which the clear, dark red liquid product was decanted from 3 grams of sludge and was then washed with water, dilute alkali and water, and was then dried and distilled. Besides unreacted tertiary butyl chloride and cyclohexene, this reaction mixture contained about 8 grams of chlorocyclohexane, 8 grams of tertiary butyl cyclohexene, and 15 grams of chlorotertiary butyl cyclohexane having a boiling point of 86–88° C. at 8 mm. pressure (215–216° C. at atmospheric pressure), a melting point of −10° C., and a refractive index, $n_D^{20}$, of 1.4790.

Of these different reaction products, the chlorotertiary butyl cyclohexane resulted from the condensation of tertiary butyl chloride and cyclohexene, while the tertiary butyl cyclohexene was formed by dehydrochlorination of chlorobutyl cyclohexane, and the hydrogen chloride resulting from this dehydrochlorination added to cyclohexene to give the chlorocyclohexane.

It is significant that the chlorobutyl cyclohexane which I obtained in the presence of the boron trifluoride catalyst is different from that obtained when aluminum chloride is the catalyst. Chlorobutyl cyclohexane formed in the presence of aluminum chloride catalyst does not crystallize even when cooled to −78° C., its refractive index at 20° C. is 1.4690, and its infrared spectrum is markedly different from that of the chlorobutyl cyclohexane produced by my process in the presence of boron trifluoride. I have found that 1-chloro-1-tertiary butylcyclohexane is formed in the presence of boron trifluoride, while a mixture of 1-chloro-1-tertiary butylcyclohexane and 1-chloro-3-tertiary butylcyclohexane is produced in the presence of an aluminum chloride catalyst.

Example V

A mixture of 52 grams of vinyl chloride and 100 grams of tertiary butyl chloride cooled to −78° C. in a glass autoclave liner was sealed into an autoclave and 4 grams of boron trifluoride was pressed in. The autoclave was rotated at room temperature for four hours, allowed to stand overnight, and then opened. Distillation of the liquid product yielded 108 grams of 1,1-dichloro-3,3-dimethylbutane with B. P. 147–148° C., M. P. −60° C., and $n_D^{20}$ 1.4399.

The same dichloroneohexane, namely 1,1-dichloro-3,3-dimethylbutane, is obtained, but in lower yield by the reaction of isobutyl chloride with vinyl chloride.

Example VI 1-fluo-3,3-dimethylbutane (B. P., 75–76° C.; $n_D^{20}$ 1.3732; $d_4^{20}$ 0.7818; identified by hydrolysis to 3,3-dimethylbutanol) is obtained in good yield by the reaction of 50 grams of tertiary butyl fluoride with ethylene in the presence of 3 grams of boron trifluoride using the proceduce of Example II.

The foregoing specification and examples illustrate the novelty and utility of the present invention, although neither section is introduced with the intention of unduly limiting its generally broad scope.

I claim as my invention:

1. A process which comprises reacting a monohalogenated saturated hydrocarbon having at least 3 carbon atoms per molecule with a monoolefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactants in liquid state, whereby to produce a higher boiling halogenated saturated hydrocarbon having a molecular weight equal to the sum of the molecular weights of the reactants and recovering said higher boiling halogenated saturated hydrocarbon.

2. A process which comprises reacting a monohaloalkane having at least 3 carbon atoms per molecule with a mono-olefinic compound selected from the group consisting of a mono-olefin and a halomono-olefin hydrocarbon in the presence of a boron trifluoride catalyst at a temperature of from about −10° C. to about 100° C. and a pressure sufficient to maintain a substantial proportion of the reactants in liquid state, whereby to produce a higher boiling halo-alkane having a molecular weight equal to the sum of the molecular weights of the reactants and recovering said higher boiling halo-alkane.

3. A process which comprises reacting a primary monohalo-alkane having at least 3 carbon atoms per molecule with a mono-olefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactance in liquid state, whereby to produce a higher boiling halo-alkane having a molecular weight equal to the sum of the molecular weights of the reactants and recovering said higher boiling halo-alkane.

4. A process which comprises reacting a secondary monohalo-alkane with a mono-olefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactants in liquid state, whereby to produce a higher boiling halo-alkane having a molecular weight equal to the sum of the molecular weights of the reactants and recovering said higher boiling halo-alkane.

5. A process which comprises reacting a tertiary monohalo-alkane with a mono-olefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactants in liquid state, whereby to produce a higher boiling halo-alkane having a molecular weight equal to the sum of the molecular weights of the reactants and recovering said higher boiling halo-alkane.

6. A process which comprises reacting a monohalo-cyclo-alkane with a mono-olefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactants in liquid state, whereby to produce a higher boiling halo-cyclo-alkane having a molecular weight equal to the sum of the molecular weights of the reactants and recovering said higher boiling halocyclo-alkane.

7. A process which comprises reacting a tertiary monohalocyclo-alkane with a mono-olefinic compound selected from the group consisting of a mono-olefin hydrocarbon and a halomono-olefin in the presence of a boron trifluoride catalyst at a temperature of from about −10° C. to about 100° C. and a pressure sufficient to maintain a substantial proportion of the reactants in liquid state, whereby to produce a higher boiling halocyclo-alkane having a molecular weight equal to the sum of the molecular weights of the reactants and recovering said higher boiling halocyclo-alkane.

8. A process which comprises reacting a monochlorinated saturated hydrocarbon having at least 3 carbon atoms per molecule with a mono-olefin hydrocarbon in the presence of a boron trifluoride catalyst at a temperature of from about −10° C. to about 100° C. and a pressure sufficient to maintain a substantial proportion of the reactants in liquid state, whereby to produce a higher boiling chlorinated saturated hydrocarbon having a molecular weight equal to the sum of the molecular weights of the reactants and recovering said higher boiling chlorinated saturated hydrocarbon.

9. A process which comprises reacting a monochloro-alkane having at least 3 carbon atoms per molecule with a mono-olefin hydrocarbon in the presence of a boron trifluoride catalyst at a temperature of from about −10° C. to about 100° C. and a pressure sufficient to maintain a substantial proportion of the reactants in liquid state, whereby to produce a higher boiling chloro-alkane having a molecular weight equal to the sum of the molecular weights of the reactants and recovering said higher boiling chloro-alkane.

10. A process which comprises reacting a monochlorocyclo-alkane with a mono-olefin hydrocarbon in the presence of a boron trifluoride catalyst at a temperature of from about −10° C. to about 100° C. and a pressure sufficient to maintain a substantial proportion of the reactants in liquid state, whereby to produce a higher boiling chlorocyclo-alkane having a molecular weight equal to the sum of the molecular weights of the reactants and recovering said higher boiling chlorocyclo-alkane.

11. A process which comprises reacting a monochloro-butane with a mono-olefin hydrocarbon in the presence of a boron trifluoride catalyst at a temperature of from about −10° C. to about 100° C. and a pressure sufficient to maintain a substantial proportion of the reactants in liquid state, whereby to produce a higher boiling chloro-alkane having a molecular weight equal to the sum of the molecular weights of the reactants and recovering said higher boiling chloro-alkane.

12. A process which comprises reacting a tertiary butyl halide with a mono-olefin hydrocarbon in the presence of a boron trifluoride catalyst at a temperature of from about −10° C. to about 50° C. and a pressure sufficient to maintain a substantial proportion of the reactants in liquid state, whereby to produce a higher boiling halo-alkane having a molecular weight equal to the sum of the molecular weights of the reactants and recovering said higher boiling halo-alkane.

13. A process which comprises reacting tertiary butyl chloride with a mono-olefin hydrocarbon in the presence of a boron trifluoride catalyst at a temperature of from about −10° C. to about 50° C. and a pressure sufficient to maintain a substantial proportion of the reactants in liquid state, whereby to produce a higher boiling chloro-alkane having a molecular weight equal to the sum of the molecular weights of the reactants and recovering said higher boiling chloro-alkane.

14. A process which comprises reacting tertiary butyl chloride with ethylene in the presence of a boron trifluoride catalyst at a temperature of from about −10° C. to about 50° C. and a pressure sufficient to maintain a substantial proportion of the reactants in liquid state, whereby to produce a chloroneohexane and recovering the last-named compound.

15. A process which comprises reacting tertiary butyl chloride with cyclohexane in the presence of a boron trifluoride catalyst at a temperature of from about −10° C. to about 50° C. and a pressure sufficient to maintain a substantial proportion of the reactants in liquid state, whereby to produce a chlorotertiary butyl cyclohexane and recovering the last-named compound.

16. A process which comprises reacting tertiary butyl chloride with a monochloromono-olefin in the presence of a boron trifluoride catalyst at a temperature of from about −10° C. to about 50° C. and a pressure sufficient to maintain a substantial proportion of the reactants in liquid state, whereby to produce a dichloro-alkane having a molecular weight equal to the sum of the molecular weights of the reactants and recovering said dichloro-alkane.

17. A process which comprises reacting tertiary butyl chloride with vinyl chloride in the presence of a boron trifluoride catalyst at a temperature of from about −10° C. to about 50° C. and a pressure sufficient to maintain a substantial proportion of the reactants in liquid state, whereby to produce a dichlorohexane and recovering the last-named compound.

LOUIS SCHMERLING.

REFERENCES CITED

The following references are of record in the file of this patent:

UNITED STATES PATENTS

| Number | Name | Date |
|---|---|---|
| 2,068,772 | Sixt | Jan. 26, 1937 |
| 2,246,762 | Schirm | July 24, 1941 |
| 2,297,564 | Kirkbride | Sept. 29, 1942 |
| 2,399,512 | Schmerling | Apr. 30, 1946 |

FOREIGN PATENTS

| Number | Country | Date |
|---|---|---|
| 261,689 | Germany | July 2, 1913 |
| 695,125 | France | Dec. 11, 1930 |
| 824,909 | France | Feb. 18, 1938 |

OTHER REFERENCES

Henne: "Jour. Am. Chem. Soc.," vol. 60, pages 1697, 2491 (1938).

Simons et al.: Ibid, vol. 60, pages 2956–7 (1938).

Simons et al.: "Industrial and Engineering Chemistry," vol. 32, pages 178–80 (1940).

Nenitzescu et al.: "Ber. der Deut. Chem. Gesell.," vol. 69B, pages 2706–7 (1936).

Nenitzescu et al.: "Annalen der Chemie," vol. 519, page 267 (1935).

Truffault: "Comptes Rendus," vol. 202, pages 1286–7 (1936).

Simons et al.: "Jour. Am. Chem. Soc.," vol. 65, pages 1269–1271 (1943).